United States Patent [19]

Soshi et al.

[11] Patent Number: 5,150,144
[45] Date of Patent: Sep. 22, 1992

[54] LENS DRIVING DEVICE

[75] Inventors: Isao Soshi; Tatsuhide Takebayashi, both of Tokyo, Japan

[73] Assignee: Asahi Kogaku Kogyo Kabushiki Kaisha, Tokyo, Japan

[21] Appl. No.: 655,345

[22] Filed: Feb. 14, 1991

[30] Foreign Application Priority Data

Feb. 14, 1990 [JP] Japan .................. 2-13294[U]

[51] Int. Cl.⁵ .............................................. G03B 13/00
[52] U.S. Cl. .................... 354/400; 354/195.12
[58] Field of Search ............... 354/400, 195.1, 195.12, 354/412

[56] References Cited

U.S. PATENT DOCUMENTS

| | | | |
|---|---|---|---|
| 4,299,457 | 11/1981 | Ducommun | 354/195.12 |
| 4,465,352 | 8/1984 | Hirobe et al. | 354/406 |
| 4,866,468 | 9/1989 | Himuro et al. | 354/195.1 |
| 4,885,600 | 12/1989 | Iwasa et al. | 354/400 |
| 4,933,700 | 6/1990 | Ikeda et al. | 354/400 |
| 4,936,664 | 6/1990 | Haraguchi et al. | 350/429 |
| 4,994,843 | 2/1991 | Kitazawa | 354/409 |

FOREIGN PATENT DOCUMENTS

| | | |
|---|---|---|
| 1532576 | 11/1978 | United Kingdom . |
| 2233777 | 1/1991 | United Kingdom . |
| 87/07036 | 11/1987 | World Int. Prop. O. . |

*Primary Examiner*—L. T. Hix
*Assistant Examiner*—David M. Gray
*Attorney, Agent, or Firm*—Sandler, Greenblum & Bernstein

[57] ABSTRACT

A device for driving a lens including one or more lens groups displaceable in a direction along the optical axis by an electric drive unit. A memory unit is provided for storing a position of the lens group, and a controller for displacing one or more lens groups to the position stored in the memory unit by the electric drive unit.

10 Claims, 2 Drawing Sheets

LENS DRIVING DEVICE

BACKGROUND OF THE INVENTION

1. Field of the Invention

This invention is concerned with a lens driving device which drives a group of lenses by an electric power drive in optical equipment, especially camera lenses.

2. Description of Related Art

In the recent years, there has been developed an increasing number of still cameras, such as compact cameras with a so called lens shutter system, which are equipped with a motor-driven power zoom lens for zooming.

When taking pictures using a camera with such a power zoom lens, there is a time when the user wants to zoom the subject at a certain focal length quickly, for instance in such a case described below. When shooting at the moment a moving subject passes through a certain point, the photographer determines the shooting position beforehand, directs the camera to the specific point, determines a desired composition by zooming, brings the point into focus by the automatic focusing and waits. In this situation, when the subject does not comes into the specific position, the photographer may zoom in and out, or direct the camera to other subjects. When the composition is different from the desired one such as this, it may not be possible to bring the focus back to the desired focal length by the time the subject comes to the specific position.

SUMMARY OF THE INVENTION

This invention is based on the aforementioned needs, and its purpose is to offer a lens driving device which enables power zooming by a simple operation, for example by zooming to a preset focal distance, and to offer a camera equipped with such a lens driving device.

To achieve the purpose, the invention features a memory means to memorize the position of the lens in which one or more lens groups are moved along the light-axis direction by an electric power driving device, and a control means to drive the lens or lens groups via the electric power driving device to the position stored in the memory means.

In a preferred example, it is possible to form it in such a way that a desired focal distance is preset by operating an operation means, and then, power zooming is automatically done to the preset focal distance by operating the operation means.

It is also possible to form the invention such that the operation means is composed of a pair of switches, and the focal distance memory means memorizes a focal distance when both switches are turned on simultaneously. When only one of them is turned on, zooming is controlled by the electric driving device to the focal distance memorized by the control means on the focal distance memory means.

The present disclosure relates to subject matter contained in Japanese utility model application No. 02-13294 (filed on Feb. 14, 1990) which is expressly incorporated herein by reference in its entirety.

BRIEF DESCRIPTION OF THE DRAWINGS

The invention will be described below in detail with reference to the accompanying drawings, in which.

DESCRIPTION OF PREFERRED EMBODIMENTS

Figure 1:
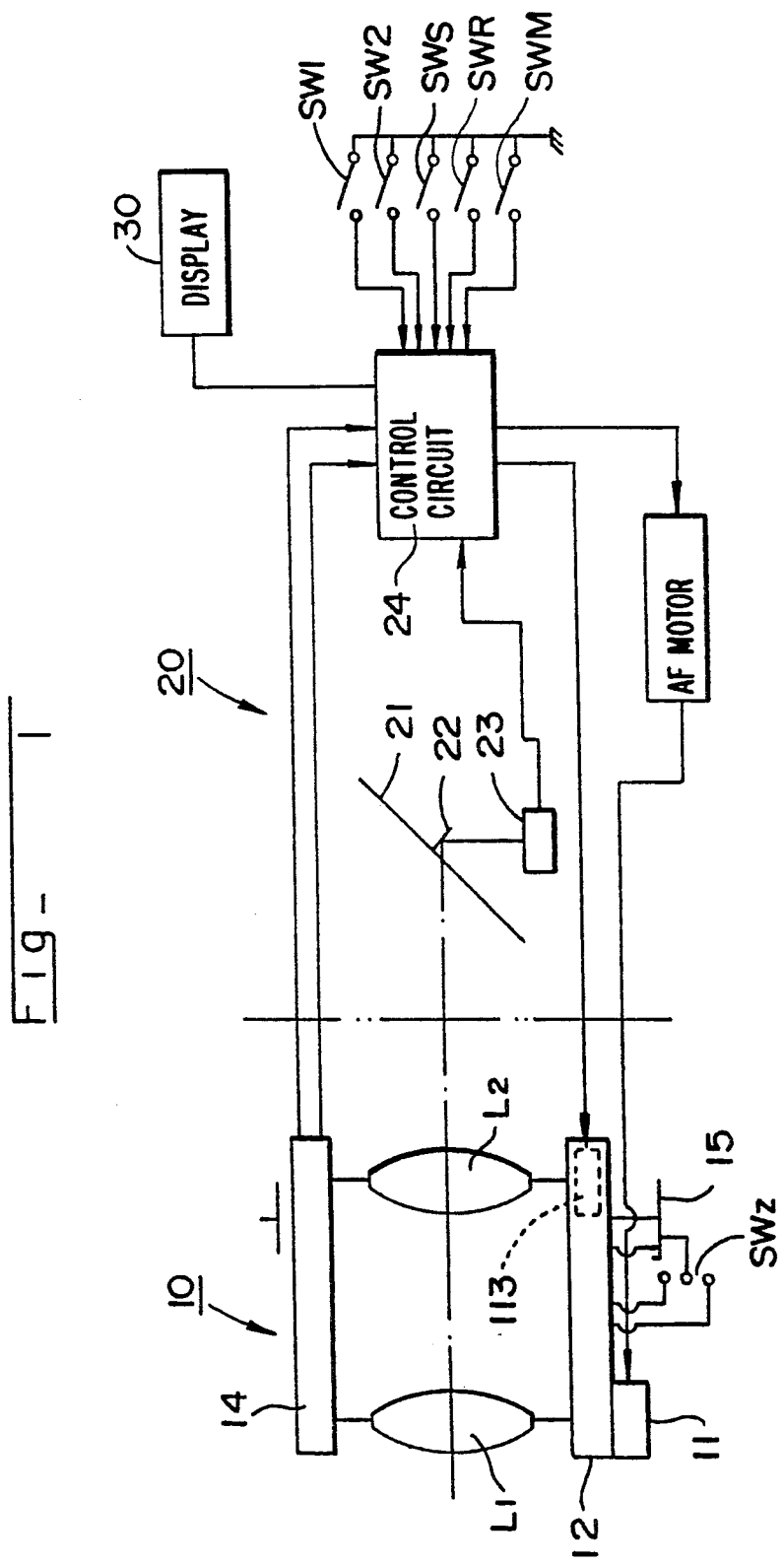
FIG. 1 is a block diagram showing a preferred embodiment of the major composition of a single reflex camera that applies the invention.

The following description of the invention is based on the usage example shown in the figures. FIG. 1 is a block diagram showing only the major components of the single reflex camera to which the preset zoom lens of this invention is applied.

The power zoom lens 10 has first lens group L1 and second lens group L2. First lens group L1 is driven by the focusing mechanism 11 to control focusing. First and second lens groups L1 and L2 are driven by the zooming mechanism 12 to change the focal length. These driving mechanisms 11 and 12 use a cam ring with a publicly-known cam groove and a cam mechanism with a cam follower fitted in the cam groove.

Also, in this example, the focus control mechanism 11 is powered by the AF motor 25 mounted on the camera body 20, while the zooming mechanism 12 is powered by the zoom motor 13 mounted on the zoom lens 10.

The in-focus distance to the subject and the focal length of the said power zoom lens 10 are separately read in by the distance data detecting (reading) means 14. This information which is read in is sent out to the camera body 20 through the contact pins (not shown in the figure) located on the mounting surfaces of the zoom lens 10 and the camera body 20.

The power zoom lens 10 is equipped with a CPU (not shown in the figure), which enables communication between the camera body 20 and the control mechanisms such as the focusing mechanism 11, zooming mechanism 12 and distance detecting means 14.

This power zoom lens 10 is equipped with a zoom operation ring 15, which functions as an operation switch, in such a manner that it rotates freely and returns to the neutral position by a spring. The zoom operation ring 15 is linked to the zoom switch SWZ with a pair of contact points and is turned off when the zoom operation ring 15 is at the neutral position. The zoom switch SWZ is turned on with one contact point turned on when the zoom operation ring 15 is rotated clockwise or counter-clockwise. Based on the contact point turned on, the zoom motor 13 starts rotating to the specified direction, and according to the direction, the lens groups L1 and L2 move for zoom to either the telescopic-side or wide-side along the light-axis direction.

Part of the subject's light beam going through the lens groups L1 and L2 of the power zoom lens 10 mounted on the camera body 20 is guided to the CCD distance-measuring sensor 23 after going through the half mirror portion of main mirror 21 and reflected by the sub mirror 22. This CCD distance-measuring sensor 23 employs a phase-difference detecting method and sends out phase-difference information of the subject image separated into halves to the control circuit 24. The control circuit 24 executes a publicly known predictor calculation based on the phase-difference information to obtain the amount of defocus and its direction. Then it starts the AF motor 25, drives the focus control mechanism 11 and adjusts the focus by moving first lens group L1 along the light-axis direction. The process of the aforementioned automatic focus control is called the "AF process" in this description.

In addition, the control circuit 24 enables controlled zooming by driving the zoom motor 13. In-Focus distance data D (distance data to the subject) from the distance measuring means 14 and focal length data f are entered into the control circuit 24.

The camera body 20 is equipped with a measuring switch SWS which starts light measurement and an automatic focusing operation, a release switch SWR which enables exposure by driving the mirror 21, shutter and diaphragm (not shown in the figure), and a mode selection switch SWM for selecting a mode.

In addition, a preset switch SW1 and a set switch SW2 are equipped as an operation means for the preset zoom mode. The preset switch SW1 is a switch SW which makes possible to preset values for the focal distance and the subject distance, whereas the preset switch SW2 presets values when operated together with the preset switch SW1, and controls the operations to the preset values when operated alone. These switches are connected to the input port of the control circuit 24. All of the aforementioned switches SW are open switches.

Next, the preset zoom mode of the said example is explained. When the preset switch SW1 is turned on, the preset mode becomes ready. If the set switch SW2 is pushed in this condition, the focal length data f at this time is read in by the distance reading means 14 and entered into the control circuit 24. The control circuit 24 memorizes the focal distance f as the preset focal distance fp. That is, when the preset switch SW1 and the set switch SW2 are turned on simultaneously, the focal distance f at that time is memorized (or preset).

If the set switch SW2 is pushed when the preset switch SW1 is off, the control circuit 24 takes in the focal distance data f from the distance data reading means 14 and compares the focal distance f with the preset value fp, then controls zooming until they become equal by driving the zoom motor 13 to such a direction that the focal distance f and the preset focal distance fp get closer.

By this example as mentioned above, when the photographer wants to preset the focal distance f, he pushes both the preset switch SW1 and set switch SW2 simultaneously. He can bring the focal distance f back to the preset condition by pushing only the set switch SW2.

When the photographer pushes the set switch SW2 while rotating the zoom operation ring 15, he may put a priority on either operation of the zoom operation ring 15 or set switch SW2. It is also possible to employ such a combination in which when the preset switch SW1 is pushed, the focal distance f is preset, and simultaneously the data for the in-focus subject distance D is read in from the distance reading means 14 and memorized as the preset value Dp. In this case, the control circuit 24 controls zooming as mentioned above when only the preset switch SW2 is pushed, and at the same time drives the AF motor 25 to bring the lens into focus with the preset value Dp.

Moreover, the combination can be such that the preset value fp and Dp can be selected by the photographer at will.

Figure 2:
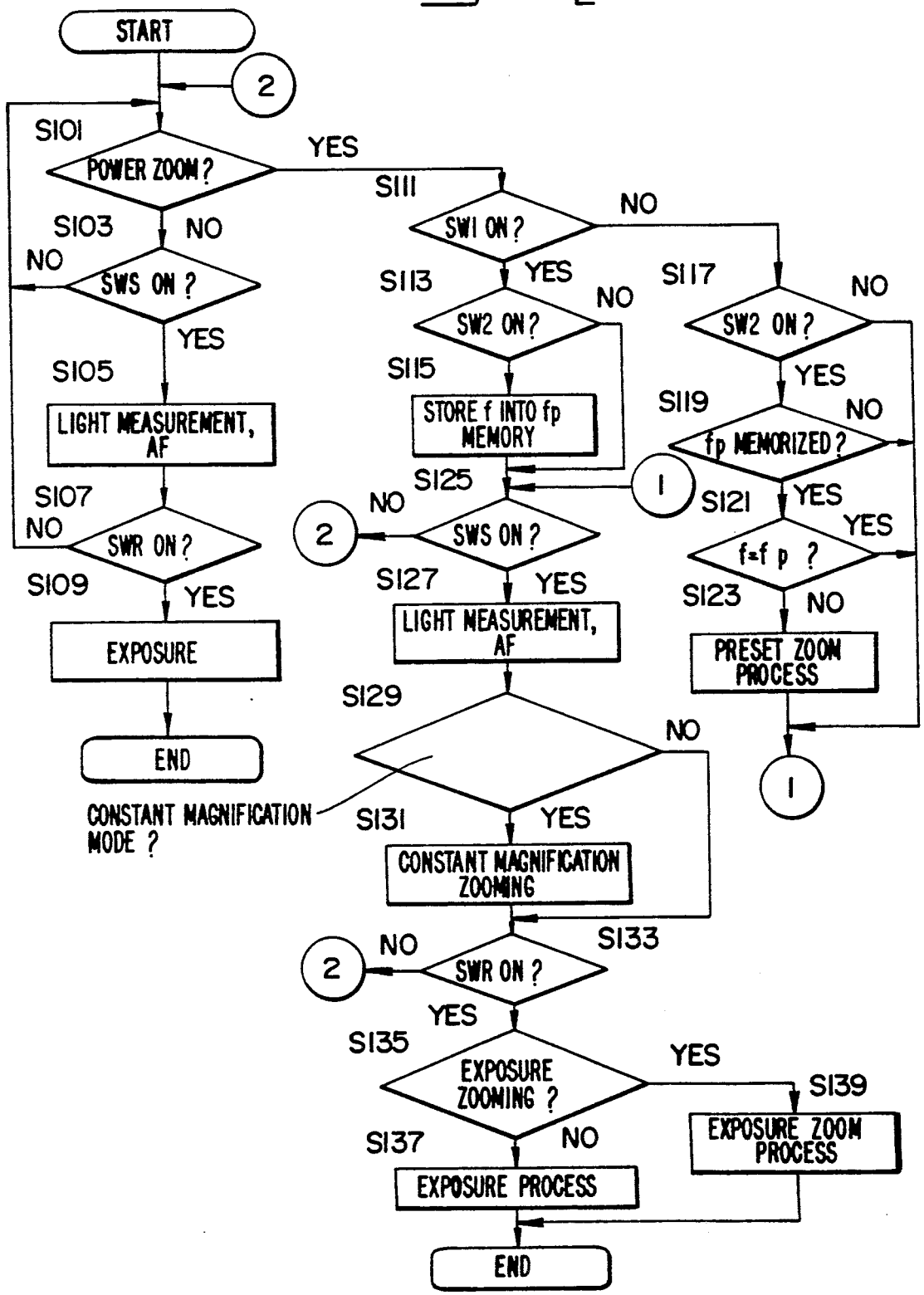
FIG. 2 is a flow chart for the major operation of the same single reflex camera.

Next, the preset zoom operation in a camera is explained based on the operation flow chart shown in FIG. 2.

This operation is executed by the control circuit 24 according to the control program stored in ROM of the control circuit 24.

First, when the main switch SW3 is turned on, whether a power zoom lens is mounted or not is checked (S101).

If a power zoom lens is not mounted, the light measuring switch SWS is checked to see if it is on. If it is on, light measurement and an AF processing are executed. Then whether the release switch SWR is on or not is checked, and if it is on, an ordinary exposure process is executed, and this flow chart ends (S103, S105, S107 and S109). If the light measuring switch SWS is not on, the execution returns to Step S101 without processing anything. If the light measuring switch SWS is on but the release switch SWR is not on, light measurement and the AF process are executed and then the execution returns to Step S101.

When a power zoom lens 10 is mounted, the preset switch SW1 and set switch SW2 are checked to see if they are on (S111, S113 and S117). If the preset switch SW1 is on and the set switch SW2 is also on, it is in the preset mode. Then the present focal length f is memorized as the preset focal length fp. If the preset switch SW1 is on but the set switch SW2 is not on, the execution proceeds to Step S125 (S111, S113, S115).

When the preset switch SW1 is not on but set switch SW2 is on, the preset focal length Fp is checked to see if it has been memorized. If set switch SW2 is not on, the execution jumps to Step S125 (S117). If the preset focal length fp has not been memorized, the execution jumps to Step S125. If fp has been memorized, the focal length f at the time and preset focal length fp are compared to determine whether they are equal or not. If f=fp, then the execution jumps to Step S125. If f is not equal to fp, controlled zooming is executed so that f=fp, then the execution proceeds to Step S125 (S119, S121 and S123).

In Step S125, the light-measurement switch SWS is checked to determine whether it is on or not. If it is not on, the execution returns to Step S101, and if it is on, a light measurement and AF process are executed, then a check is made to determine if in the constant magnification mode is checked (S125, S127 and S129). If not in the constant magnification mode, the execution jumps to Step S133. If in the constant magnification mode, zooming is executed so that the magnification becomes constant, then the execution proceeds to Step 133 to see if the release switch SWR is on or not (S129, S131 and S133). The constant magnification mode is the mode where zooming is done so that the value (distance to subject)/(focal distance) becomes constant.

If the release switch SWR is not on, the execution returns to Step S101. If it is on, a check is made to determine whether it is in the exposure zoom mode or not (S135).

If it is not in the exposure zoom mode, an ordinary exposure process is executed and the flow chart ends. If it is in the exposure zoom mode, an exposure zoom process in which zooming is done during exposure, is executed and this flow chart ends (S135, S137 and S139).

In this example, the photographer can operate power zooming at will during the aforementioned processes.

Although the aforementioned example shows a combination in which the selection of the preset mode is done by the preset switch SW1, another combination, in which the selection is done by the mode selection switch SWM, is also possible. In this case, the preset mode is cancelled by the mode selection switch SWM after presetting in the preset mode.

It is favorable that the preset switch SW1 and set switch SW2 are installed on the power zoom lens 10. For instance, if they may be installed on the position where the index and middle fingers can push them, the photographer can operate the zoom operation ring 15 simultaneously with one hand.

As described above, an explanation was given using an example in which the invention is applied to a single reflex camera. However, this invention can be applied to lens shutter cameras. In such a case, all the operations can be controlled by a single CPU. The invention can also be applied to interchangeable lenses for single reflex cameras that do not have a preset zoom function in their camera body. In this case, a control means (CPU), preset switch SW1 and set switch SW2 can be installed in the interchangeable lenses themselves.

Furthermore, if a display 30 is equipped to display the presence of a preset value and the preset value itself, then the preset condition can be observed precisely.

As described above, by using a preset zoom lens of this invention and a camera with such a lens, presetting the focal length and a control to achieve the preset value can be done easily by operating an operation means. Therefore, even when the photographer is shooting under the conditions different from preset values, the preset focal length can be resumed by a simple operation of the operating means. This eliminates many missed photographing opportunities.

We claim:

1. A device for driving a power zoom lens including one or more lens groups displaceable in a direction along the optical axis by means of an electric drive unit comprising:
    memory means for storing a focal length position of said lens group;
    control means for displacing said one or more lens groups to said focal length position stored in said memory means by means of said electric drive unit, for controllable zooming thereof; and,
    operation means for actuating said memory means to store a current focal length and for causing said control means to perform said controllable zooming to said focal length stored in said memory means, wherein said operation means comprises a pair of switches whereby, when both switches are concurrently actuated in the ON position, said memory means memorizes a focal length, and, when only one of said switches is actuated ON, said control means performs said controllable zooming so as to drive said electric drive unit to said focal length memorized in said memory means.

2. The device according to claim 1, further comprising a preset operation means for storing a current focal length in said focal length memory unit.

3. The device according to claim 2 further comprising a set operation means for causing said control means to perform said controllable zooming to said focal length stored in said focal length memory unit.

4. The device according to claim 1, wherein said power zoom lens includes at least two lens groups adapted to be driven by said electric drive unit in a direction along said optical axis while varying distance therebetween and means for detecting positions of said lens groups.

5. The device according to claim 1 further comprising a detecting means which detects a position of said one or more lens groups.

6. The device according to claim 1, wherein said lens is detachably mounted to a camera body.

7. The device according to claim 6, wherein said lens includes said electric drive device, and wherein said camera body includes said memory unit and said control means.

8. The device according to claim 1, wherein said power zoom lens is detachably mounted to a camera body.

9. The device according to claim 8, wherein said power zoom lens includes an electric drive device, and wherein said camera body includes said focal length memory unit, said control means and said operation means.

10. The device according to claim 1, wherein said lens includes a focusing lens group to be driven by said electric drive unit, wherein said memory means is a memory unit for memorizing position of said focusing lens group, and wherein said control means is adapted to drive said electric drive unit so as to move said lens group to said position memorized in said memory means.

* * * * *